Nov. 9, 1943.　　O. M. WHITTEN　　2,334,053
BRAKE CONSTRUCTION
Filed Sept. 2, 1941　　3 Sheets-Sheet 1
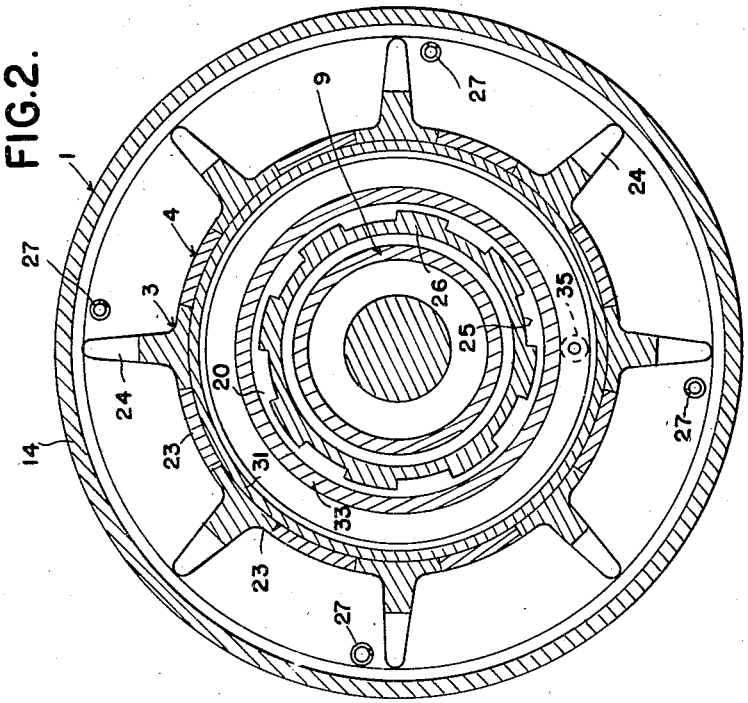
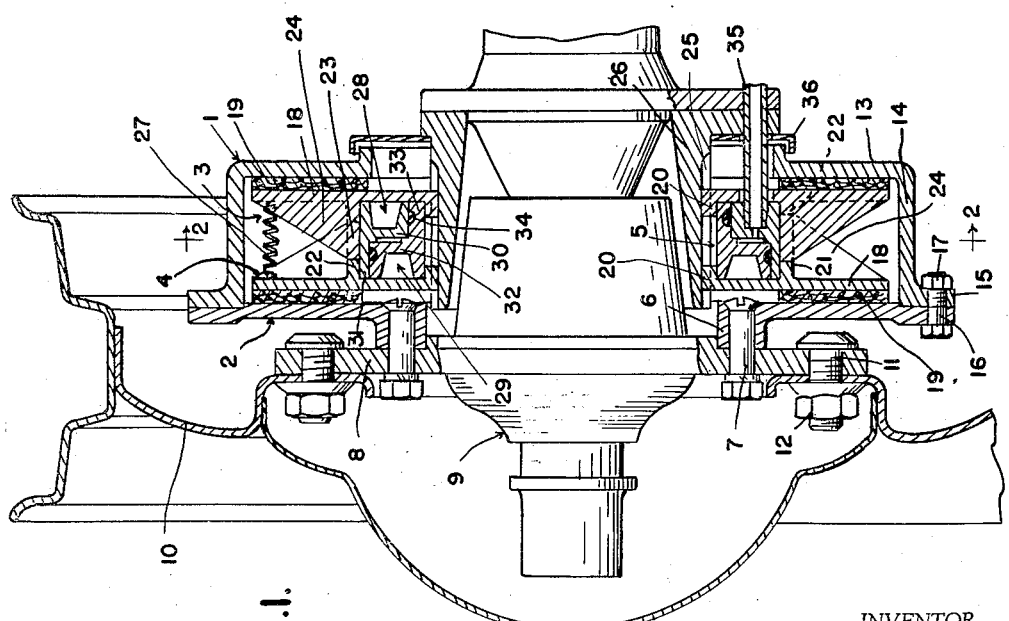
INVENTOR.
OWEN M. WHITTEN
BY
ATTORNEYS

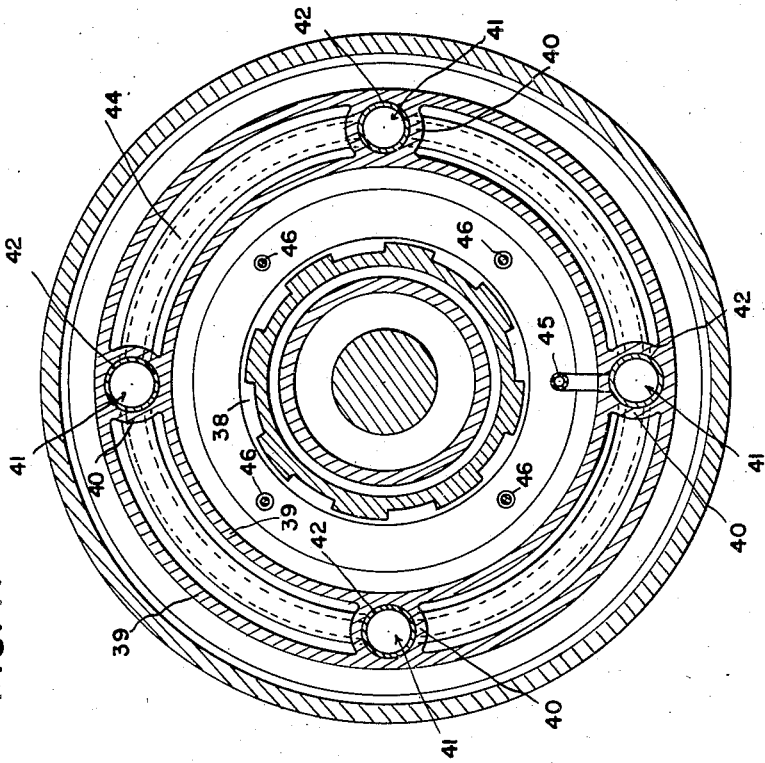
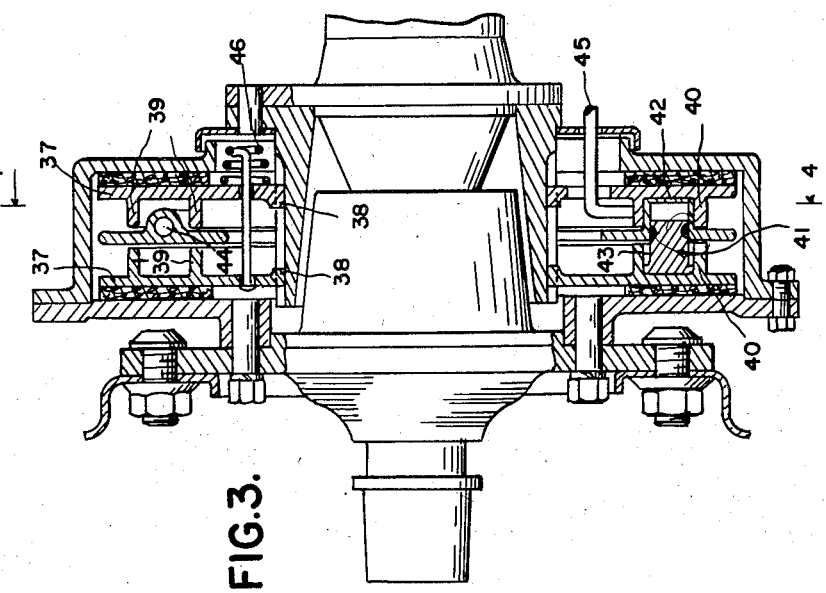

Nov. 9, 1943.   O. M. WHITTEN   2,334,053
BRAKE CONSTRUCTION
Filed Sept. 2, 1941   3 Sheets-Sheet 3
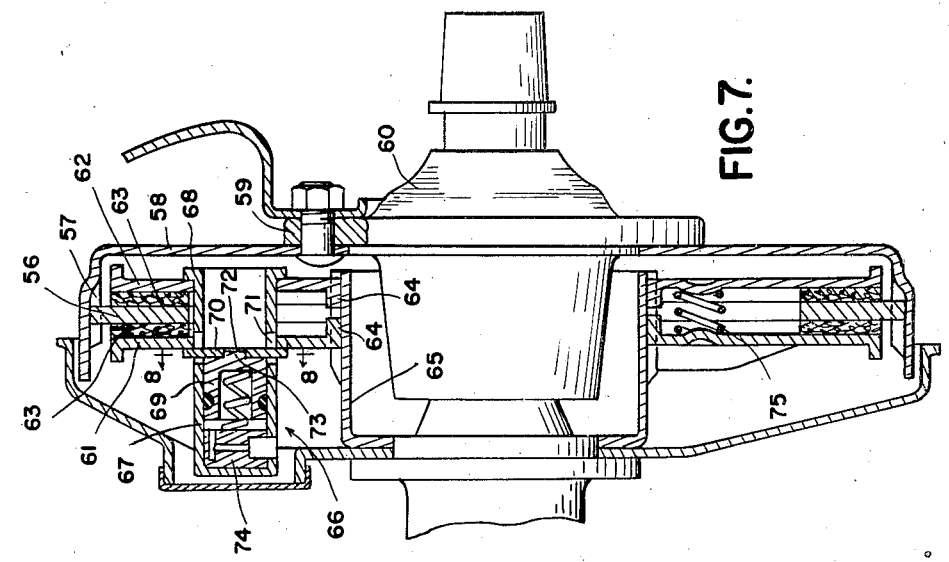
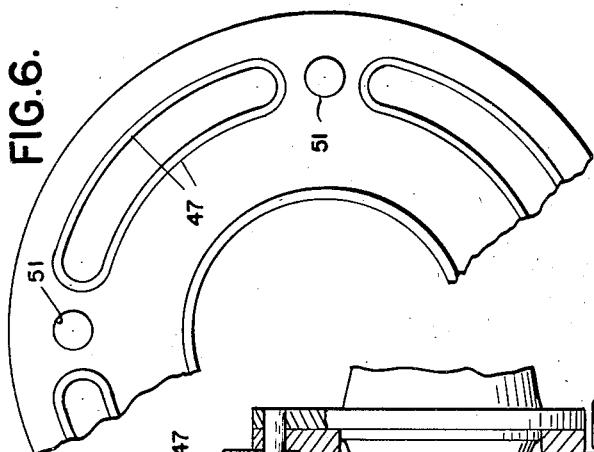
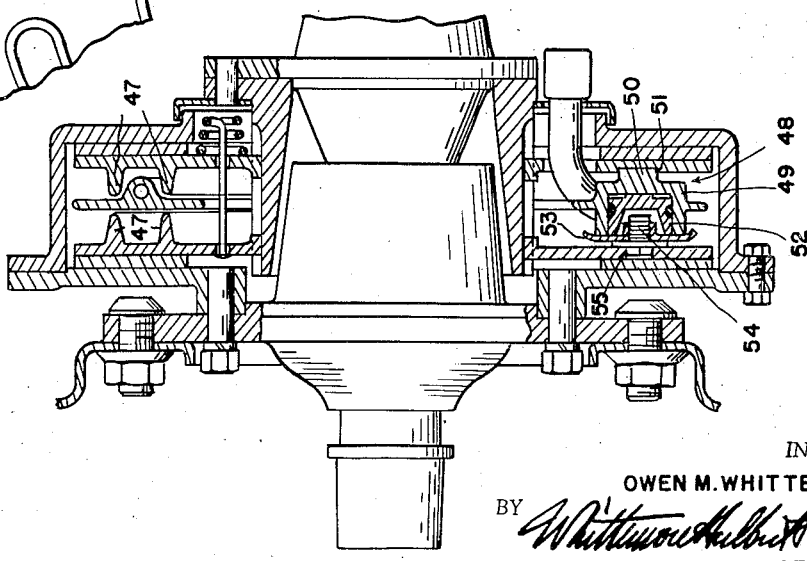
INVENTOR.
OWEN M. WHITTEN
ATTORNEYS Patented Nov. 9, 1943

2,334,053

UNITED STATES PATENT OFFICE 2,334,053

BRAKE CONSTRUCTION

Owen M. Whitten, Detroit, Mich., assignor to Kelsey-Hayes Wheel Company, Detroit, Mich., a corporation of Delaware Application September 2, 1941, Serial No. 409,288

4 Claims. (Cl. 188—152)

The invention relates to brake constructions and refers more particularly to brake constructions for vehicle wheels.

The invention has for one object to provide an improved brake construction having fluid pressure operated brake elements constructed to position the fluid pressure operated actuator.

The invention has for another object to form the brake elements of discs having reinforcing ribs serving to position the fluid pressure operated actuator.

The invention has for a further object to provide a fluid pressure operated actuator comprising plungers guided by each other and cooperating to form a chamber for receiving the fluid medium for actuating the plungers.

With these as well as other objects in view, the invention resides in the novel features of construction and combinations and arrangements of parts, as more fully hereinafter set forth.

In the drawings:

Figure 1 is a central axial section through a brake construction showing an embodiment of the invention;

Figure 2 is a cross section on the line 2—2 of Figure 1;

Figure 3 is a view similar to Figure 1, showing another embodiment;

Figure 4 is a cross section on the line 4—4 of Figure 3;

Figure 5 is a view similar to Figure 1 with the upper portion at an angle to the lower portion, showing another embodiment;

Figure 6 is an inside elevation of a portion of one of the brake elements;

Figure 7 is a view similar to Figure 1, showing another embodiment;

Figure 8 is a cross section on the line 8—8 of Figure 7.

As illustrated in Figures 1 and 2, the brake construction comprises the rotatable inboard and outboard brake elements 1 and 2, respectively, the non-rotatable inboard and outboard brake elements 3 and 4, respectively, between the brake elements 1 and 2, and the fluid pressure operated actuator 5. The outboard brake element 2 is a generally radially extending disc having the concentric series of tubular bosses 6 for receiving the driving pins 7 secured to the fixed flange 8 of the wheel hub 9. The wheel body 10 is constructed to be detachably secured to the fixed flange by suitable means, such as the bolts 11 and the nuts 12 located beyond the driving pins 7. The inboard brake element 1 is formed with the radially extending disc portion 13, the annular flange 14 and the generally radially extending flange 15, which latter is secured to the outboard brake element by suitable means, such as the bolts 16 and the nuts 17.

The inboard and outboard non-rotatable brake elements 3 and 4, respectively, are alike. Each is in the nature of a disc having the generally radially extending body 18 to which is secured the annular brake lining 19 for engaging either the outboard rotatable brake element or the disc portion of the inboard rotatable brake element. Each non-rotatable brake element is formed with the concentric radially inner and outer reinforcing projections 20 and 21, respectively, which extend generally axially toward the other non-rotatable brake element. The radially outer projection 21 has the annular rib 22 and the peripherally spaced tongues 23 extending from the edge of the rib. Each non-rotatable brake element is further reinforced by the integral generally radially extending ribs 24 which connect into the body 18, the rib 22, and the tongues 23. The non-rotatable brake elements are so arranged that the tongues 23 of both axially overlap. The radially inner projection 20 is in the nature of a rib having portions slidably engaging the axial key ways 25 formed in the sleeve 26 secured to the axle housing. This latter construction holds both of the non-rotatable brake elements from rotation.

27 are peripherally spaced axially extending coil springs connected to the bodies 18 of the non-rotatable brake elements to resiliently move the same toward each other.

The fluid pressure operated actuator 5 comprises the inboard and outboard plungers 28 and 29, respectively, which are movable away from each other to move the non-rotatable brake elements into engagement with the rotatable brake elements. The inboard plunger 28 comprises the annular body 30 which abuts the body 18 of the inboard non-rotatable brake element 3 and also engages its annular rib 22. The inboard plunger also comprises the annular flange 31 which engages the annular rib 22 of the outboard non-rotatable brake element and also preferably the tongues 23 of both the inboard and outboard non-rotatable brake elements. The plunger 29 comprises the body 32 which abuts the body 18 of the outboard non-rotatable brake element and engages its radially inner projection 20. The outboard plunger also has the annular flange 33 which engages the radially inner projection 20 of the inboard non-rotatable brake element. The annular flange 31 of the inboard plunger is slidably engaged by the body 32 of the outboard plunger and the annular flange 33 of the outboard plunger is slidably engaged by the body 30 of the inboard plunger so that the bodies and annular flanges of the two plungers cooperate to form a chamber for receiving the braking fluid under pressure. Suitable sealing rings 34 are preferably provided between the sliding surfaces of the plungers. The braking fluid is admitted to the chamber formed in the plungers by the tubing 35.

36 is a suitable peripherally flanged closure plate fixedly secured to the axle housing and cooperating with the inboard rotatable brake element 1 to prevent the entrance of dirt, moisture, and the like.

With the above construction, it will be seen that the rotatable brake elements are exposed to the air to more efficiently cool the brake. Also, that the brake is so constructed that all of its parts form a unit which may be readily mounted or demounted. Further, that a simple construction of fluid pressure operated actuator is provided so arranged with respect to the non-rotatable brake elements that the latter carry and position the actuator.

Figures 3 and 4 illustrate another modification in which the arrangement and mounting of the rotatable brake elements is the same as illustrated in Figures 1 and 2. The non-rotatable brake elements are in the nature of discs having the generally radially extending bodies 37 each of which is reinforced by the concentric radially inner projection or rib 38 and the pair of concentric annular projections or ribs 39 radially outwardly of the rib 38. The bodies are further reinforced by the arcuate projections or ribs 40 which cooperate with the ribs 39 to form, in effect, an annular series of annular projections or ribs. 41 are fluid pressure operated actuators each comprising the cylinder 42 and the piston 43 slidable within the cylinder. The cylinders fit within the annular projections or ribs formed by the ribs 39 and 40 of the inboard non-rotatable brake element, while the pistons fit within the corresponding annular ribs of the outboard non-rotatable brake element. The cylinders are preferably made integral with each other and are connected by the integral conduit 44 which in turn is connected to the tubing 45 for carrying the braking fluid under pressure. In this embodiment, it will be noted that the non-rotatable brake elements are resiliently urged toward each other by means of the coil springs 46 located radially inwardly beyond the brake linings.

In the embodiment illustrated in Figures 5 and 6, the construction of the rotatable brake elements is the same as that previously described, but the nonrotatable brake elements differ essentially in interrupting the pair of concentric projections or ribs 47 to provide spaces between their ends for receiving the fluid pressure operated actuators 48. Each of these actuators comprises the cylinder 49 having the projection 50 for engaging the annular shoulder 51 formed by a recess in the body of the inboard non-rotatable brake element. The actuator also comprises the piston 52 slidable within the cylinder and abutting the adjustment disc 53 which is threaded on the stud 54 fitting the annular shoulder 55 formed by a recess in the outboard non-rotatable brake element. The cylinders are connected in the same manner as the cylinders of Figures 3 and 4. With this construction it will be seen that the non-rotatable brake elements provide annular shoulders for positioning and mounting the fluid pressure operated actuators and also that the construction of brake is such that it may be mounted or demounted as a unit.

Figures 7 and 8 illustrate another embodiment in which the rotatable brake element 56 is a disc slidable in the axial keyways 57 formed in the annular flange of the rotatable carrier element 58. This carrier element is secured at its inner edge by suitable means to the fixed flange 59 of the wheel hub 60. 61 and 62 are the inboard and outboard non-rotatable brake elements, respectively. These elements are discs having secured thereto the linings 63 for engaging the rotatable brake element 56. The non-rotatable brake elements are formed at their inner edges with the concentric axially extending projections or ribs 64 which are slidably splined upon the sleeve 65 fixedly secured to the axle housing.

66 are fluid pressure operated actuators for the non-rotatable brake elements. Each actuator comprises the cylinder 67 having a portion extending through axially aligned openings in the non-rotatable brake elements radially inwardly of the rotatable brake element. The inboard end of the cylinder is formed with the annular flange 68 for abutting the inboard side of the inboard non-rotatable brake element. The actuator also comprises the piston 69 slidable within the cylinder and operatively connected to the inboard non-rotatable brake element by means of the key 70 which extends through the diametrically opposite axially extending slots 71 in the cylinder and abuts the inboard side of the inboard non-rotatable brake element. To hold the key in place, it is formed with the opening 72 for receiving the axial projection 73 upon the piston. It will be noted that each of the cylinders is formed of sheet metal and that they are provided with the plugs 74 at their closed ends which are tapped to receive the braking fluid conduit. 75 are compression coil springs located between the non-rotatable brake elements for resiliently separating the same.

What I claim as my invention is:

1. In a brake, rotatable brake elements, non-rotatable brake elements between and engageable with said rotatable brake elements having generally radially extending bodies and substantially axially aligned radially inner and outer projections extending toward each other, a pair of annular plungers between said bodies and projections having opposed annular bodies engaging said brake element bodies and certain of said projections and annular flanges extending generally axially from said plunger bodies and engaging the other of said projections, the body of each plunger cooperating with the flange of the other plunger to form a chamber for a fluid medium.

2. An actuator for brake elements comprising axially aligned annular plungers, each of said plungers having an annular body and a concentric annular flange extending axially beyond said body, the body of each of said plungers slidably engaging the flange of the other of said plungers and the bodies and flanges of said plungers cooperating to form a chamber for a fluid medium.

3. In a brake, rotatable brake elements, non-rotatable brake elements between and engageable with said rotatable brake elements having generally radially extending bodies and concentric substantially axially aligned radially inner and outer ribs extending toward each other with said radially outer ribs formed at their outer edges with axially overlapping tongues, a pair of annular plungers between said brake element bodies and ribs having opposed annular bodies abutting said brake element bodies and engaging certain of said ribs, said plungers also having integral flanges extending generally axially from said plunger bodies and engaging the other of said ribs, the body of each plunger cooperating with the flange of the other plunger to form a chamber for a fluid medium.

4. A fluid pressure operated actuator for brake elements comprising axially aligned annular plungers movable in opposite directions, each of said plungers comprising an annular body, annular means on the body of one of said plungers encircling and guiding the body of the other of said plungers, annular means on the body of the other of said plungers extending within and guiding the body of said first mentioned plunger, said bodies and both of said annular means cooperating to form a chamber for receiving a fluid medium and sealing rings between said bodies and annular means.

OWEN M. WHITTEN.